W. H. THOMPSON.
CHAIN CONNECTOR.
APPLICATION FILED APR. 1, 1916.
1,208,697.
Patented Dec. 12, 1916.
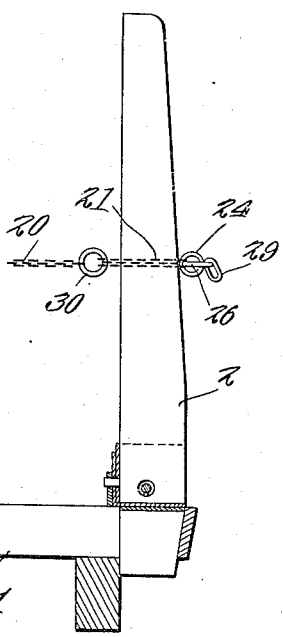
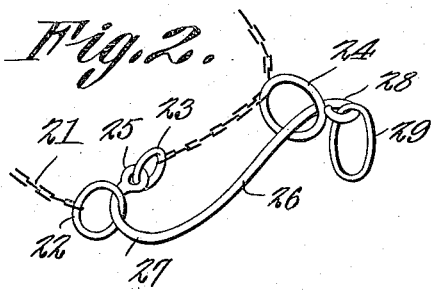
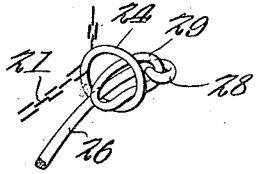
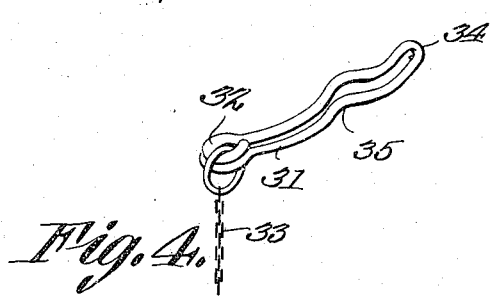
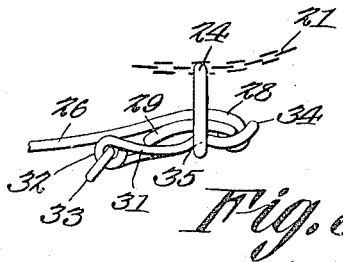
Witnesses
W. H. Thompson
Inventor,
by
Attorneys.

UNITED STATES PATENT OFFICE.

WILLIAM H. THOMPSON, OF MARINETTE, WISCONSIN, ASSIGNOR OF ONE-HALF TO MICHAEL PETERS, OF MENOMINEE, MICHIGAN.

CHAIN-CONNECTOR.

1,208,697. Specification of Letters Patent. Patented Dec. 12, 1916.

Original application filed December 31, 1915, Serial No. 69,581. Divided and this application filed April 1, 1916. Serial No. 88,331.

*To all whom it may concern:*

Be it known that I, WILLIAM H. THOMPSON, a citizen of the United States, residing at Marinette, in the county of Marinette and State of Wisconsin, have invented a new and useful Chain-Connector, of which the following is a specification.

There is disclosed in this application, a chain connector divided out of my application for Letters Patent on a car attachment, Serial No. 69,581, filed on the 31st day of December, 1915.

The present invention aims to provide novel means whereby the ends of a chain or like flexible element may be detachably and releasably united.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 is a side elevation showing one of the many applications of the device forming the subject matter of this application; Fig. 2 is a perspective showing the structure forming the subject matter of this application, the same being in locked position; Fig. 3 is a perspective showing a portion of the structure delineated in Fig. 2, Fig. 3 illustrating an intermediate step in the process of releasing the fastening shown in Fig. 2; Fig. 4 is a perspective showing the releasing member used with the fastening shown in Fig. 2; and Fig. 5 is a side elevation showing the fastening of Fig. 2 in operative relation to the releasing means of Fig. 4.

The structure forming the subject matter of this application may be used for widely different purposes, in order to connect the ends of a chain, or to connect the ends of two chains. In order, however, to illustrate one application of the invention, there is shown in the drawings, a car 1 holding a side stake 2.

The numeral 30 indicates a ring at the end of a chain 20, and the structure forming the subject matter of this application may be used to connect rings 30 at the opposite ends of the chain 20 by opposed stakes of the sort denoted by the numeral 2.

The structure forming the subject matter of this application is not confined to the single use above described.

In carrying out the present invention there is provided a flexible element 21 equipped at one end with a primary ring 22. A secondary ring 23 is attached to the other end of the flexible element 21. An intermediate ring 24 is connected to the flexible element 21 between the ends of the flexible element, relatively close to the ring 23. Pivoted at 25 to the ring 23 is lever 26 having a bend 27. The lever 26 passes through the ring 22 as clearly shown in Fig. 2, and the bend 27 of the lever 26 engages the ring 22, the free end of the lever 26 passing through the intermediate ring 24. Pivoted at 28 to the free end of the lever 26 is a third ring 29, which coöperating with the ring 24, acts as a keeper. When the fastening means shown in Fig. 2 is connected with the ring 30 and it is extended around the stake 2, it will be obvious that the stake will be held to one end of the chain 20.

A releasing means is provided whereby the lever 26 may be disengaged from the rings 24 and 22. This releasing means is in the form of a link 31 having eyes 32 at one end, the eyes 32 receiving an operating member in the form of a chain or cord 33. At the other end of the link 31 there is fashioned a bend 34. Intermediate its ends the link is provided with a seat 35. When it is desired to release the fastening means as shown in Fig. 2, the third ring 29 is folded down onto the lever 26 and projects through the intermediate ring 24, as shown in Fig. 3, and as shown in Fig. 5. Then the link 31 is passed through the intermediate ring 24, the bend 34 of the link being detachably seated on the free end of the lever 26, the seat 35 in the link 31 coacting with the intermediate ring 24, and the link 31 resting on the ring 29, as shown in Fig. 5, so that the ring 29 serves as a support for the link 31. Should the flexible element 33 be drawn upon, the link 31 will be transformed into a lever, the fulcrum of which is at the point where the bend 34 of the link engages the free end 28 of the lever 26. When the link 31 thus is operated lever-wise, the free end of the ring 24 is swung around to the right (in Fig. 5) and is freed from the ring 29 and the hold of the flexible element 21 on the stake 3 will be released.

Having thus described the invention, what is claimed is:—

1. A fastening and a releasing means therefor, comprising a flexible element; a primary ring; an intermediate ring carried by the flexible element and spaced from the end of the flexible element; a lever pivoted to the end of the flexible element and extended through the primary ring, the lever embodying a free end extended through the intermediate ring; a detachable link extended through the intermediate ring and having at one end a bend detachably received upon the free end of the lever; and an operating means assembled with the other end of the link.

2. A fastening and a releasing means therefor, comprising a flexible element; a primary ring; an intermediate ring carried by the flexible element and spaced from the end of the flexible element; a lever pivoted to the end of the flexible element and extended through the primary ring, the lever embodying a free end extended through the intermediate ring; a third ring pivoted to the free end of the lever and coacting with the intermediate ring to form a keeper, the third ring being adapted to be folded within the intermediate ring, into contact with the lever; a link extended through the intermediate ring and supported on the third ring, the link having at one end a bend detachably seated on the lever; and an operating means connected with the other end of the link.

3. A fastening and a releasing means therefor, comprising a flexible element; a primary ring; an intermediate ring carried by the flexible element and spaced from the end of the flexible element; a lever pivoted to the end of the flexible element and extended through the primary ring, the lever embodying a free end extended through the intermediate ring; a releasing member extended through the intermediate ring and provided intermediate its ends with a seat for receiving the intermediate ring, one end of the releasing member being bifurcated to straddle the free end of the lever; and an actuating means assembled with the other end of the releasing member.

In testimony that I claim the foregoing as my own, I have hereto affixed my signature in the presence of two witnesses.

WILLIAM H. THOMPSON.

Witnesses:
E. B. LEWIS,
SADIE LEWIS.

Copies of this patent may be obtained for five cents each, by addressing the "Commissioner of Patents, Washington, D. C."